US006935463B2

(12) United States Patent
Brewster

(10) Patent No.: US 6,935,463 B2
(45) Date of Patent: Aug. 30, 2005

(54) SAFETY SUPPORT FOR LADDERS

(75) Inventor: William Kevin Brewster, Blue Springs, MO (US)

(73) Assignee: K & B Products, Inc., Blue Springs, MO (US)

( * ) Notice: Subject to any disclaimer, the term of this patent is extended or adjusted under 35 U.S.C. 154(b) by 0 days.

(21) Appl. No.: 10/605,116

(22) Filed: Sep. 9, 2003

(65) Prior Publication Data

US 2005/0067224 A1 Mar. 31, 2005

(51) Int. Cl.[7] .............................. E06C 1/00; E06C 7/00; F16M 11/24

(52) U.S. Cl. ..................... 182/204; 182/200; 248/188.4

(58) Field of Search ................................ 182/200–205, 182/107, 108, 109, 129; 248/188.2–188.4

(56) References Cited

U.S. PATENT DOCUMENTS 1,624,945 A * 4/1927 Glover ........................ 182/204
2,581,782 A * 1/1952 Anderson ................... 182/204
3,791,487 A * 2/1974 Baumann .................... 182/201
4,209,078 A 6/1980 Gerber
4,284,172 A 8/1981 Cohen
4,423,797 A * 1/1984 Batten ......................... 182/204
4,502,565 A 3/1985 Koffski
4,606,432 A 8/1986 Belt
4,607,726 A 8/1986 Davis et al.
4,671,383 A * 6/1987 Huang ......................... 182/204
4,722,420 A * 2/1988 Arthurs et al. ................ 182/93
4,744,441 A 5/1988 Sandstrom
4,766,976 A 8/1988 Wallick, Jr.
4,773,805 A * 9/1988 Krahling ...................... 411/351
4,792,017 A * 12/1988 Grove ......................... 182/204
4,807,720 A 2/1989 Kim
4,836,331 A * 6/1989 Foradori ...................... 182/107
4,844,208 A 7/1989 Veness
4,907,675 A * 3/1990 Saby et al. .................. 182/107
5,027,923 A * 7/1991 Derome ...................... 182/201
5,064,024 A 11/1991 Barham
5,107,958 A 4/1992 Johnson
5,181,584 A 1/1993 Simard
5,222,575 A 6/1993 Santos
5,273,133 A 12/1993 Thocher et al.
5,307,900 A * 5/1994 Noga ......................... 182/204
5,542,497 A 8/1996 Macyszyn
5,551,529 A * 9/1996 Molitor ....................... 182/204

* cited by examiner

*Primary Examiner*—Hugh B. Thompson, II
(74) *Attorney, Agent, or Firm*—Hovey Williams LLP

(57) ABSTRACT

A ladder safety support for use with an existing ladder is disclosed. The support includes an attachment assembly for removable connection to the lower end of the ladder and one of two interchangeable foot assemblies for supporting the ladder on a surface. The first foot assembly provides a surface-penetrating stake having a lower tapered section and presenting a pointed tip and a threaded portion for removably attaching the stake to the assembly. The second foot assembly is similarly removable and provides a surface-engaging pad.

42 Claims, 5 Drawing Sheets

SAFETY SUPPORT FOR LADDERS

BACKGROUND OF INVENTION

1. Field of the Invention

The present invention relates generally to safety devices for ladders. More specifically, the present invention concerns an adjustable ladder safety support.

2. Discussion of Prior Art

Ladder safety devices have been developed for increasing safety during conventional ladder usage. More particularly, these devices have been incorporated to improve the stability of the ladder. Despite the efforts of these devices and other measures, however, ladder usage still present problems to the user. For example, conventional ladder usage can result in ladder slippage caused by insufficient friction or toppling. Even where slippage or toppling does not occur, the perceived possibility of either occurrence is one factor that often results in anxiety within the common user. Where ladder usage is desired on sloped ground or soft soil, the likelihood of toppling or slipping occurring and the associated anxiety of the user are increased.

One category of devices functions to re-orient an askew ladder in a generally vertical or upright direction by attaching to and extending from the lower leg or stile of the ladder. While, these devices help to level the ladder, the dangers of slippage have not been eliminated. Furthermore, on soft ground these devices may also sink under the combined weight of the ladder and user, resulting in further eccentricity.

Another problem associated with conventional ladder safety devices is their inability to adjust to different environments. More particularly, while a device may be useful in a particular application or soil condition, it may be rendered inoperable when the ladder is moved to a different location.

SUMMARY OF INVENTION

Responsive to these and other problems caused by conventional ladder safety devices, the present invention concerns a ladder safety support for supporting a ladder on the ground in a secured position. The invention provides, among other things, a more stable ladder, which translates to less anxiety in the user. The more secure base connection to the ground is also useful in achieving greater ladder heights. Finally, the invention is useful for providing interchangeability between soft and hard surfaces.

A first aspect of the present invention concerns a ladder safety support comprising a connector configured to be fixed to the ladder, a shiftable member shiftably supported on the connector, and a surface-penetrating stake configured to penetrate the surface. The stake is coupled to the member, so that the stake is shiftable relative to the ladder.

A second aspect of the present invention concerns a ladder assembly comprising a ladder and a ladder safety support. The ladder includes a plurality of upright stiles and a plurality of rungs extending between and spaced along corresponding ones of the stiles. The ladder safety support is configured to support the ladder on a surface, and includes an attachment assembly securing the support to the ladder, and a surface-penetrating stake supported by the attachment assembly and configured to penetrate the surface.

A third aspect of the present invention concerns a ladder safety support for supporting a ladder on a surface. The support comprises a connector configured to be fixed to the ladder, a shiftable member shiftably supported on the connector, and a surface-engaging pad removably fixed to the member, so that the pad is shiftable relative to the connector. The pad includes an elongated rod presenting upper and lower rod ends, and a base universally connected to the rod adjacent the lower rod end. The rod presents an externally threaded upper end portion, while the shiftable member presents an internally threaded section that threadably engages the threaded end portion of the rod.

Other aspects and advantages of the present invention will be apparent from the following detailed description of the preferred embodiment and the accompanying drawing figures.

BRIEF DESCRIPTION OF DRAWINGS

A preferred embodiment of the invention is described in detail below with reference to the attached drawing figures, wherein.

DETAILED DESCRIPTION

FIGS. 1–7 depict an embodiment of a ladder assembly 10 constructed in accordance with the present invention. The illustrated ladder assembly 10 includes a pair of ladder safety supports 12 and a conventional rigid ladder 14 as commonly known in the art. Although the ladder safety support is illustrated and described herein in association with a ladder, it is within the scope of the present invention to utilize the support with other structures and objects.

Figure 3:
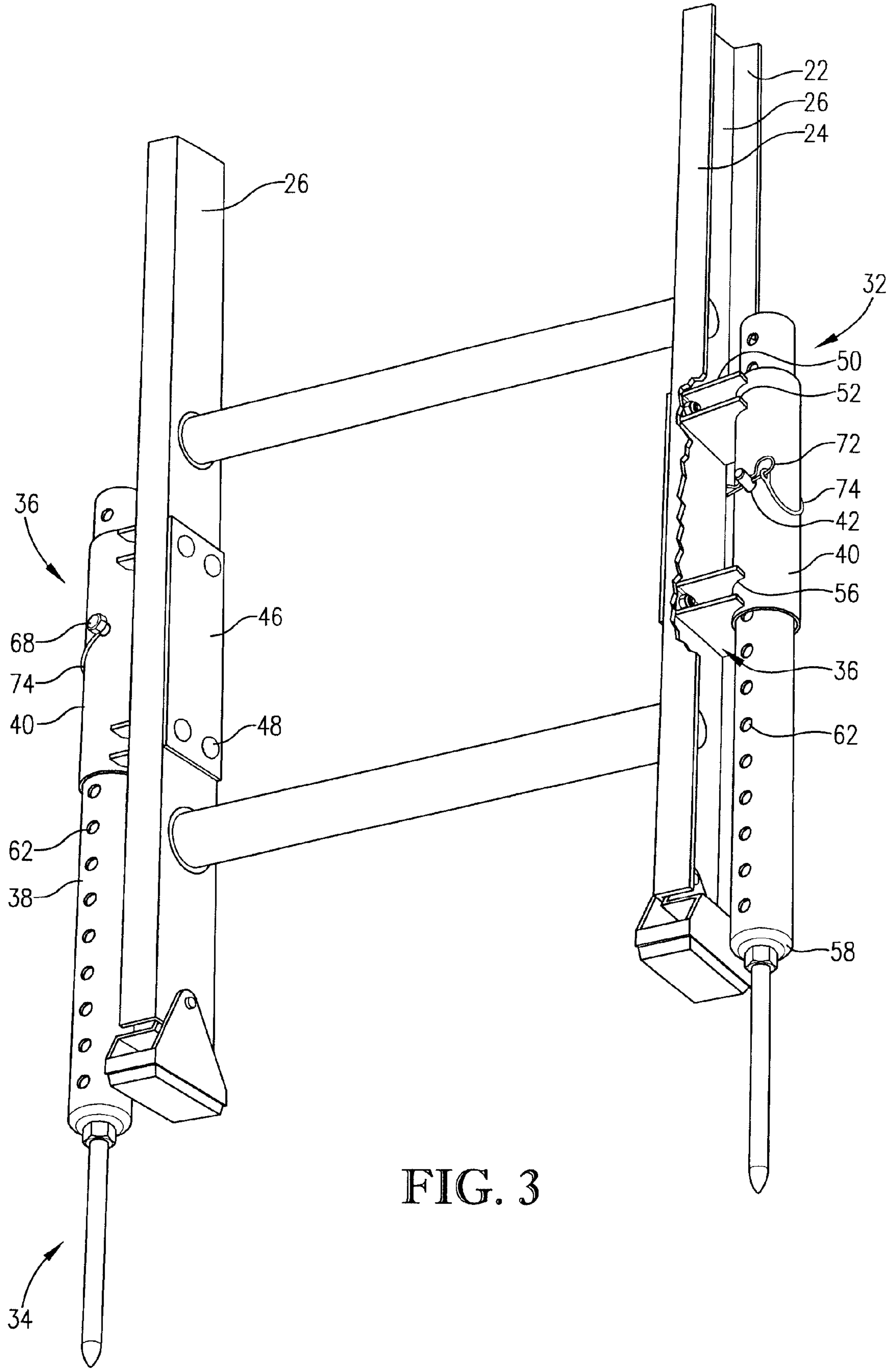
FIG. 3 is a fragmentary perspective view of the ladder assembly shown in FIGS. 1 and 2, particularly illustrating the attachment assembly.

The illustrated ladder 14 includes at least two rails or stiles 16 oriented in the longitudinal direction of the ladder 14, a plurality of lateral rungs 18, and a foot member 20 pivotally attached to each of the stiles 16 at one end. Each of the stiles 16, as best shown in FIG. 3, comprises a preferably U-shaped beam having two flanges 22 and 24, and a main panel 26 fixedly interconnecting the flanges 22,24. The rungs 18 extend between and interconnect the main panels 26 of the stiles 16. The width of the main panel 26 results in the flanges 22,24 being spaced a first distance D1, while the width of the rungs 18 results in the stiles being spaced a second distance of D2. More preferably, D1 is sufficient to enable the panel to engage the ladder safety support 12 as discussed below, and D2 and the longitudinal spacing of the rungs 18 are sufficient to safely allow the user to ascend and descend the ladder. Alternatively, other ladder configurations, including an I-beam stile, or more than two stiles, can also be utilized in conjunction with the ladder safety support 12.

Figure 1:
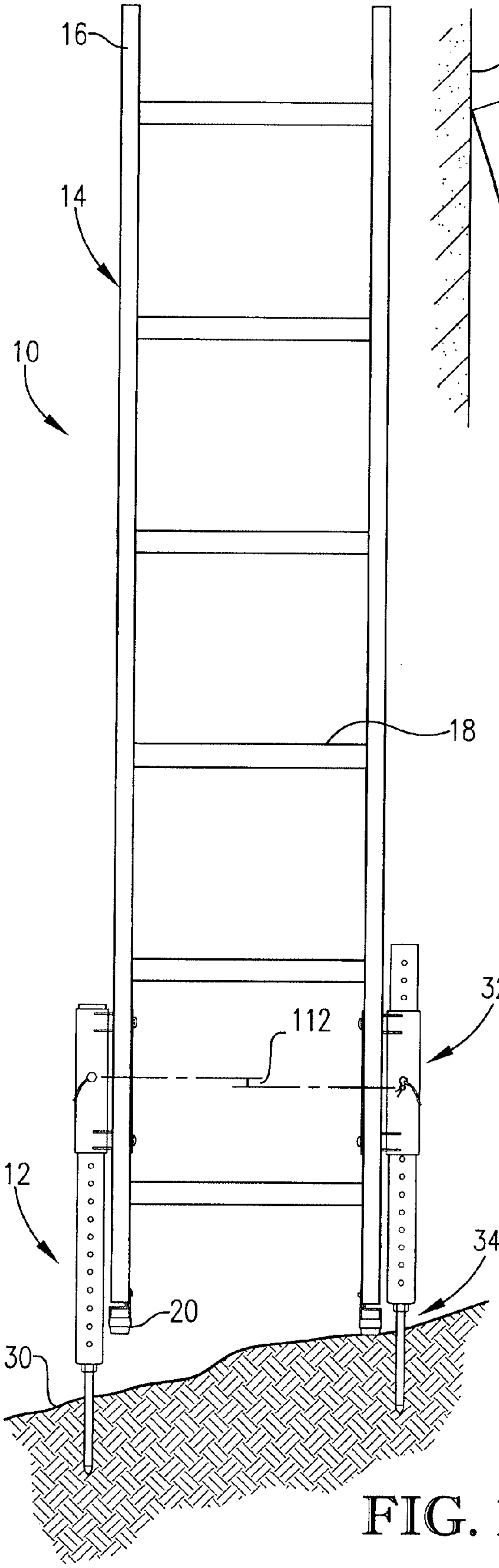
FIG. 1 is a front elevation view of a ladder assembly including a ladder and two surface-engaged ladder safety supports constructed in accordance with the present invention, particularly showing the ladder assembly on a sloped surface.
Figure 2:
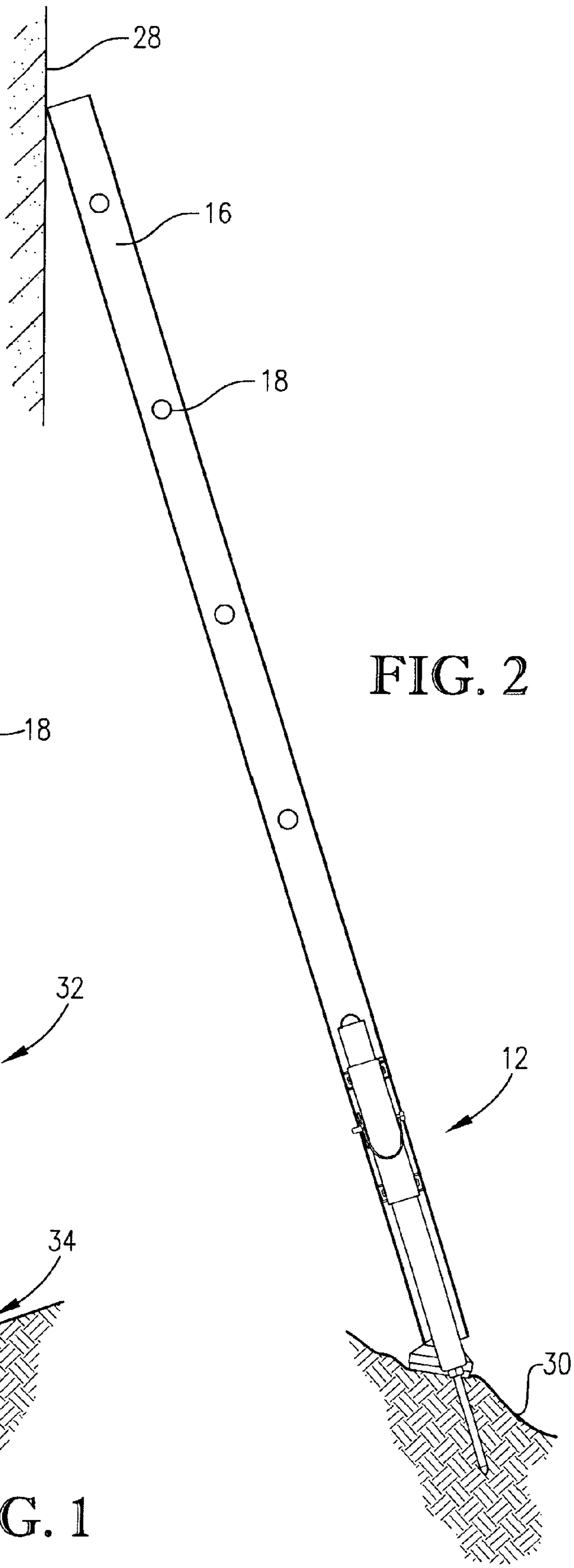
FIG. 2 is a side elevation view of the ladder assembly shown in FIG. 1, particularly showing the ladder assembly on a sloped surface and against a vertical surface.

A preferred functional orientation of the assembly 10 is shown in FIG. 2, where the ladder 14 is leaned at an angle of about fifteen degrees to a vertical surface 28. As a result, the distance from the foot 20 of the ladder to the vertical surface 28 is about one quarter of the height of the top of the ladder. It is appreciated by those skilled in the art that at steeper angles measured from the foot 20 the ladder 14 is at risk of toppling backwards when the user leans away from the vertical surface 28. In contrast, at shallower angles, the ladder 14 may lose its grip on the ground 30. As shown in FIGS. 1 and 2, the preferred orientation is not changed upon a slope, instead the ladder foot member 20 simply pivots to match the slope of the ground 30. Although the assembly 10 is illustrated and described herein in association with the ground, it is certainly within the scope of the invention to engage other surfaces, such as a scaffolding platform.

The ladder safety support 10, selected for illustration in FIGS. 1–7, generally comprises an attachment assembly 32 and one of a plurality of interchangeable foot assemblies 34. The attachment assembly 32 includes a connector 36 adapted for removable attachment to the ladder 14 preferably near the lower end, and a shiftable member 38 shiftably supported on the connector 36.

The preferred connector 36, as shown in FIG. 3, includes a tubular sleeve 40 defining preferably a single pair of diametric holes 42, at least one spacer 44 spacing the sleeve 40 from the ladder 14, a clamping plate 46, and a plurality of fasteners 48 for securing the connector 36 to the ladder 14.

The tubular sleeve 40 preferably presents a unitary body having a circular cross-section and an inside diameter. The inside diameter of the sleeve 40 is sufficiently sized in relation to the shiftable member 38, so as to allow the shiftable member 38 to snugly pass therethrough. The sleeve 40 presents a length that is sufficient to allow the attachment of the sleeve to the ladder. More preferably, the sleeve presents an inside diameter equal to one and three-quarter inches (in.), and a length not less than seven and three-quarter inches.

The connector 36 is preferably formed of metal (e.g. Aluminum, steel, etc.). Although other suitable materials capable of bearing the anticipated loads experienced during normal operating conditions may be used (e.g., high grade plastic, metal composition, etc.). Where the material is metal, sleeve 40 is not less than one-sixteenths of an inch thick.

The preferred spacer 44 presents a U-shaped configuration including two legs 50 and 52, and a cross-member 54. Each of the legs 50,52 presents a circular cutout section 56 that is slightly larger than the radius of the sleeve 40 so as to facilitate the secure attachment of the spacer 44 to the sleeve 40. In the preferred embodiment, the spacer 44 is permanently affixed to the sleeve (e.g., by a commonly known method in the art such as welding, soldering, or the like), although the spacer can alternatively be removably mounted thereto. Where the spacer is permanently attached a commonly known method in the art such welding, soldering, or the like, can be utilized. Each of the legs 50,52 further presents a predetermined length operable to space the sleeve 40 from the ladder 14 a sufficient distance that facilitates the operation of the support 10. It is appreciated that the spacing of the support also provides a proportionally broader ladder base and therefore increases the stability of the ladder. More preferably, the legs present a length not less than one and one-quarter inches as measured perpendicularly from the mid-point of the cut-out to the cross-member 54.

The cross-member 54 presents a length sufficient to enable the cross-member 54 to define a plurality of attachment openings (not shown), and to provide proper spacing for legs 50,52. More preferably, the cross-member 54 presents a length not less than one and one-quarter inches. The openings are configured to align with a plurality of ladder holes defined by the ladder (also not shown), wherein the holes are preferably located between the lower two rungs of the ladder. It is appreciated that this configuration allows the shiftable member to be stored while the connector is mounted to the ladder 14.

The clamping plate 46 is provided for engaging the ladder and cooperating with the spacer to secure the main panel 26 of the stile 16 therebetween. The clamping plate 46 presents a length and width, and defines a plurality of clamping holes (not shown). The width of the plate 46 is preferably about equal to D1 so that the plate is able to form coextensively superjacent layers with a full width portion of the main panel 26 of one of the stiles 16. The length of the plate 46 is sufficient to enable the plate 46 to overlap the plurality of holes defined by the ladder 14. The clamping holes are each alignable with one of the spacer attachment openings and the ladder holes.

In the illustrated embodiment, each of the aligned attachment openings, clamping holes, and ladder holes receive one of the fasteners 48. Each fastener 48 preferably comprises a threaded nut-and-bolt assembly. However, other alternative means for removably fastening the components can be utilized, such as clevis pins, and pull pins.

Figure 5:
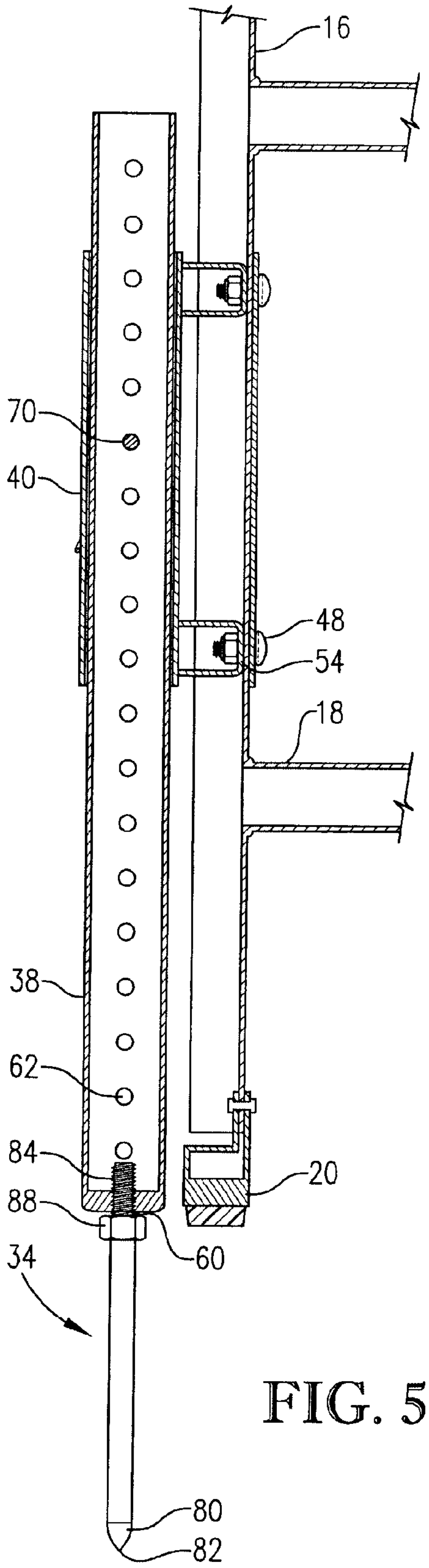
FIG. 5 is a fragmentary cross-sectional view of the ladder assembly taken along line 5—5 of FIG. 4.

As best shown in FIGS. 3 and 5, the preferred shiftable member 38 presents a hollow cylinder that is telescopically received within the sleeve 40. The cylinder presents a closed lower end 58, which preferably includes rounded edges. The lower end 58 defines an internally threaded hole 60 for receiving the foot assembly 34. The member 38 presents an outside diameter that is slightly smaller than the inside diameter of the sleeve 40 so as to promote the linear reciprocation of the member 38 within the sleeve 40. More preferably, the member 38 presents an outside diameter equal to one and one-half inches.

The shiftable member 38 also presents a predetermined longitudinal length sufficient to define a plurality of adjustment diametric openings 62. More preferably, the member 38 presents a longitudinal length equal to twenty inches. The openings 62 are preferably spaced one inch apart (center-to-center) with the first opening being spaced one inch from the top of the cylinder, so that the number of openings 62 is nineteen as shown in the illustrated embodiment. However, this number can vary and finer adjustability can be provided by reducing the spacing between the openings 62. In the embodiment illustrated, the openings extend diametrically through the member 38 (i.e., horizontally when the assembly 10 is oriented in a vertical direction). Each of the openings 62 is coaxially alignable with the diametric hole 42 defined by the sleeve 40, so as to cooperatively present a combined opening.

Figure 4:
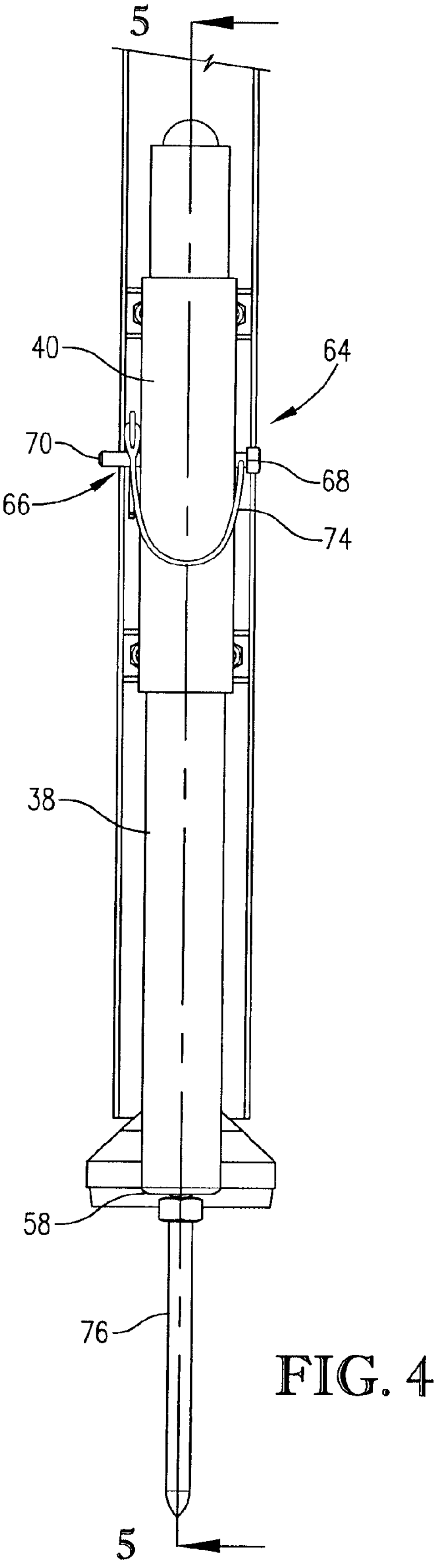
FIG. 4 is a fragmentary side elevational view of the ladder assembly shown in FIGS. 1–3, particularly illustrating the ladder safety support.

As best shown in FIGS. 3 and 4, a securing assembly 64 is provided for securely coupling the shiftable member 38 to the sleeve 40. The preferred securing assembly 64 includes a clevis pin 66 having a pin head 68 and shaft 70. The pin 66 is received within the combined opening as illustrated. A pin hole (not shown) is provided at or near the shaft end opposite the head 68, wherein a hairpin cotter 72 is removably received so that the pin 66 is selectively retained in the combined opening. Finally, a flexible cable 74 is slidably coupled to the pin 66 near the head 68 and slidably coupled to the cotter 72 at the opposite end so that the cotter 72 is coupled to the pin 66 at all times.

The interchangeable foot assemblies of the preferred embodiment are shown as being removably attached to the lower end 58 of the shiftable member 38. The first foot assembly, a surface-penetrating stake 76, is illustrated in FIGS. 1–6, while the second, a surface-engaging pad 78, is illustrated in FIG. 7.

As shown in FIG. 1, the stake 76 preferably presents a unitary cylindrical body having a predetermined length and diameter necessary for generating the required static bearing capacity in a given soil condition. More preferably, the preferred stake 76 presents a diameter not less than one-quarter inch and a penetrable length not less than one inch. Most preferably, the preferred stake 76 presents a diameter within the range of about one-half to two inches and the penetrable length is not less than five inches, so as to present an operable surface area in most soil conditions.

To reduce the driving force necessary to penetrate the ground, the stake 76 includes a tapered portion 80 adjacent the lower end of the stake. In the illustrated embodiment, the portion 80 presents a longitudinal length that is necessary to form a pointed tip 82 at the lower end of the stake. It is appreciated by those skilled in the art that the tapered portion 80 also functions as a mechanical wedge that redirects the applied force laterally to displace the soil more efficiently. The longitudinal length of the tapered portion 80 is minimized, however, so that the full stake diameter extends along a predominate portion of the penetrable length to thereby maximize the operable surface area.

Opposite the pointed tip 82 and adjacent the upper end 84, the stake 76 further presents an externally threaded portion 86. The portion 86 is dimensioned and configured to threadably engage the internally threaded hole 60 defined by the shiftable member 38 so as to removably attach the stake thereto. The portion 86 presents a longitudinal length greater than the depth of hole 60 so that an adjustably fastenable relationship between the stake and shiftable member is providable, where additional adjustability is desired. More preferably, the threaded portion presents a length not less than one-quarter inch. It is appreciated that the removability of the stake also enables the safe storage of the assembly without having to remove the entire support 12.

Figure 6:
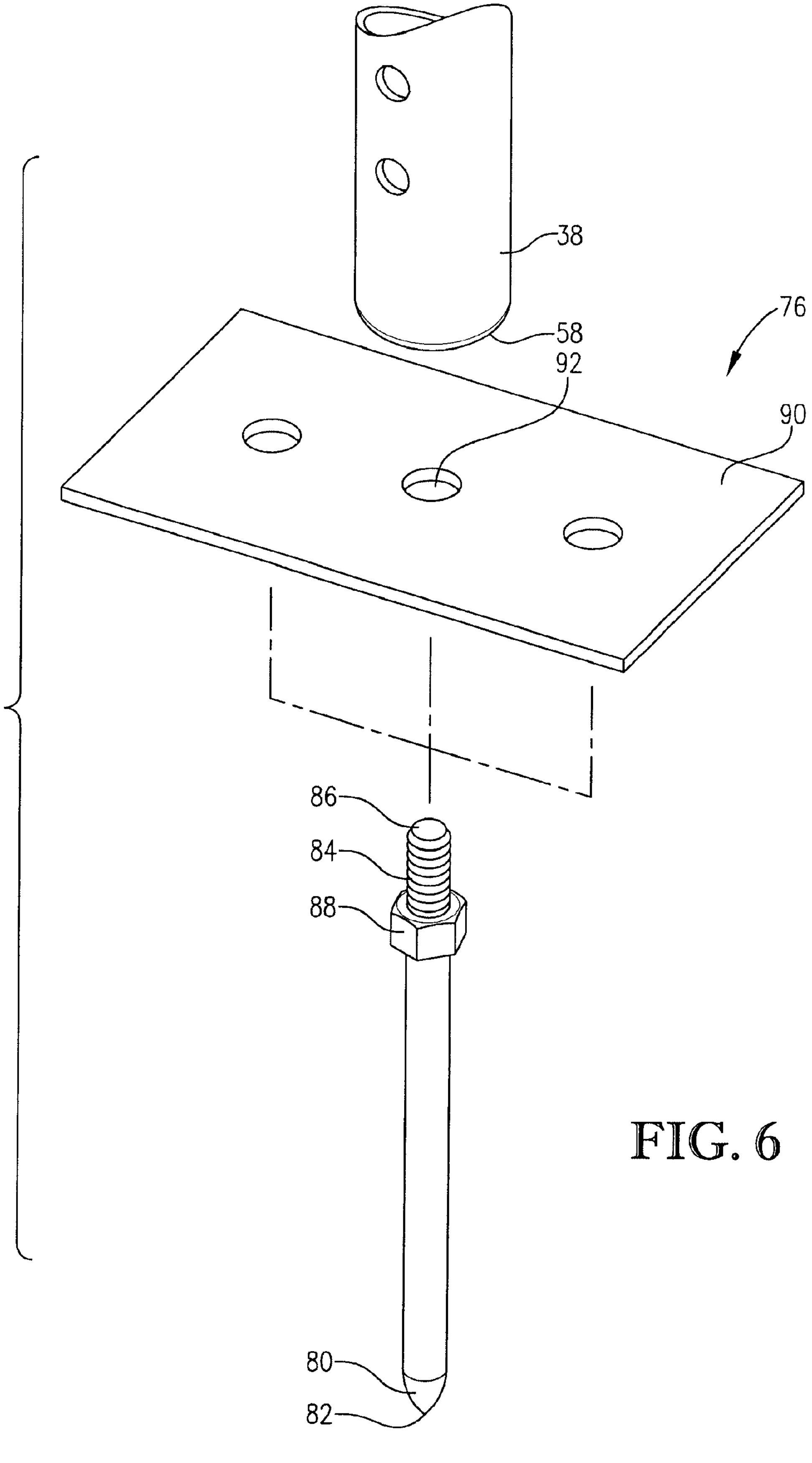
FIG. 6 is an exploded fragmentary view of a ladder safety support including a surface-engaging plate constructed in accordance with an embodiment of the present invention.
Figure 7:
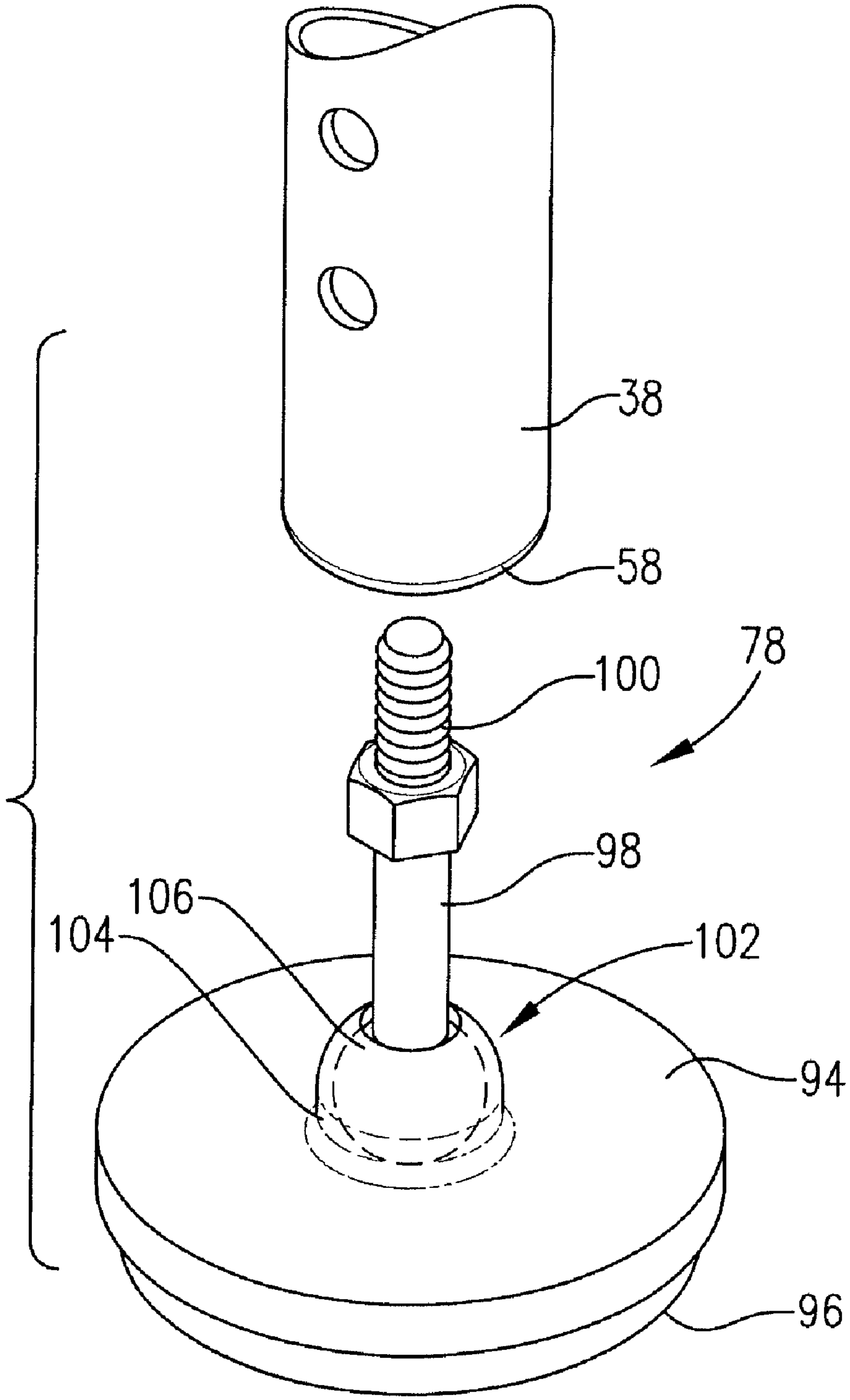
FIG. 7 is an exploded fragmentary view of a ladder safety support comprising a surface-engaging pad in accordance with the present invention.

Also shown in FIG. 6, a lock nut 88 is provided for securely fastening the stake to the member 38. The lock nut 88 preferably receives the entire portion 80 of the stake prior to being tightened against the lower end 58 of the member 38, as illustrated in FIG. 5. It is appreciated that other alternative removable locking means such as wingnuts, collars, etc., could also be utilized.

Referring again to FIG. 6, a surface-engaging plate 90 can be removably coupled to the stake 76 and member 38, where additional surface engagement is desired. For example, where flowable soil such as mud is encountered, plate 90 can be added to prevent settlement. In this arrangement, the plate 90 is sandwiched between the lock nut 88 and the lower end 58 of the member 38. The plate 90 presents a unitary body having a predetermined length, width and resultant surface area. More preferably, the plate presents a surface area set within the range of about five to one-hundred square inches. Most preferably, the plate is about four inches wide, about six inches long, and presents an area of about twenty-four square inches. The plate 90 defines a plate hole 92 that presents a slightly larger diameter than the stake diameter so that the stake 76 is receivable therein. The hole 92 is preferably co-centered along the mid-point of the plate 90 and presents a symmetrical configuration so as to evenly transfer the anticipated loads to the soil. Finally, where additional stakes are desired, a plurality of holes can be positioned at spaced intervals and centered along the mid-point of the plate, as shown in FIG. 6. A corresponding plurality of lock nuts and fasteners can be used to fasten the additional stakes to the plate 90.

As best shown in FIG. 7, the surface-engaging pad 78 presents a foot assembly operable to surficially engage a surface, so as to support the assembly 10 on the surface. The pad 78 is intended for use on hard surfaces. The pad 78 includes a disc 94 presenting a ground gripping surface 96, and an elongated rod 98 universally connected to the disc 94. The rod 98, similarly to the stake 76, presents an upper threaded portion 100 for threadably engaging the tapped hole 60 defined by the lower end 58 of the shiftable member 38. The lock nut 88 is also configured to secure the rod 98 to the member 38 as previously discussed.

To provide the preferred rotation about at least two intersecting axes, the rod 98 and disc 94 define a ball joint 102 at the lower end of the rod 98. The ball joint 102 consists of an enlarged spherical portion 104 of the rod 98 located at the lower end thereof, and a socket 106 defined by the disc 94. The socket 106 is preferably centered along the center of the disc 94, and is configured to receive the spherical portion 104.

The disc 94 presents a circular planar configuration having a predetermined diameter. More preferably, the disc 94 presents a diameter not less than about three inches. Most preferably, the disc 94 presents a diameter within the range of about five to fifty inches. The disc 94 is formed of suitable material capable of withstanding the anticipated loads and transferring the same to the hard surface. In this regard, it is appreciated by those skilled in the art that the ball joint sustains a significant lateral load along the base and therefore the material forming the socket 106 must be sized accordingly. More preferably, the disc, including the socket, is formed of metal and is at least one-quarter of an inch thick.

Embeddedly affixed to the disc on the opposite side of the socket 106, is the gripping surface 96. The gripping surface 96 preferably is made of a rubber material that has good strength, elasticity, and forming characteristics, such as one of many high grade rubber based materials commercially available. More preferably, the gripping surface 96 presents a knurled or serrated surface to better grip and hold the hard surface.

It is within the scope of the present invention to combine and integrally form separate adjacent components described herein. For example, the stake 76 and member 38 could be integrally formed to present a unitary body.

In operation, where ladder usage upon soft ground is desired, the ladder assembly 10 preferably utilizes two virtually identical supports 12 having surface-penetrating stakes 76, as shown in FIG. 1. As previously mentioned, the ladder assembly 10 is preferably erected by vertically orienting and leaning the ladder 14 against a vertical surface so that the top of the ladder forms a fifteen degree angle, as shown in FIG. 2. The lower end of the ladder is then driven into the soft ground, preferably until the shiftable member from one of the two supports 12 is brought to bear against the ground surface. More preferably, the support 12 further includes a surface-engaging plate 90 that engages the ground surface to deter settlement. Where the ground is sloped and the second support does not reach the ground in the vertical orientation, the second support 108 is adjusted by removing pin 66 from the combined opening. The shiftable member 38 is then lowered so that the elevated stake 76 is driven into the ground a sufficient distance and a new combined opening is formed. The pin 66 is then inserted through the new combined opening and the cotter clip 72 is returned retain the pin 66.

To provide a one-half inch adjustability, the combined openings presentable by the two supports are configured to present a one-half inch vertical offset 112, as shown in FIG. 1. The offset 112 is preferably provided by offsetting the diametric holes 42 defined by the two sleeves 42 an equal distance. Alternatively, however, the supports can be attached to the ladder at offsetting positions to effect the desired adjustability.

Where ladder usage upon a hard surface is desired, the ladder assembly 10, preferably includes two surface-engaging pads 78, to provide a wider base. The assembly 10 is vertically oriented as described above, and the gripping surfaces 96 of the pads 78 are brought to bear against the hard surface. Where the surface is sloped, the ball joints 104 function to pivot the gripping surfaces 96 to match the slope of the surface. Where the surface is stepped, one of the two supports 12 can be adjusted as described above. Finally, to store the assembly 10, the attached one of the foot assemblies 28 can be removed by first loosening the corresponding lock nut 88.

Alternatively, where less support is needed, the assembly 10 can include a single support 12. In this arrangement, the support 12 is attached to one of the stiles 16 and adjusted as described above. The foot 20 of the unsupported stile 16 contacts the ground in a conventional manner to cooperatively form the base.

The preferred forms of the invention and modes of operation described above are to be used as illustration only, and should not be utilized in a limiting sense in interpreting the scope of the present invention. Obvious modifications to the exemplary embodiments, as set forth herein, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A ladder safety support for supporting a ladder on a surface, said support comprising:

a connector configured to be fixed to the ladder;

a shiftable member shiftably supported on the connector; and a surface-penetrating stake configured to penetrate the surface, said stake being coupled to the member, such that the stake is shiftable relative to the ladder, said surface-penetrating stake presenting an externally threaded upper end portion, said shiftable member presenting an internally threaded section that threadably engages the threaded end portion of the stake.

2. The ladder safety support as claimed in claim 1, said surface-penetrating stake having a lower tapered end portion presenting a pointed tip.

3. The ladder safety support as claimed in claim 1; and a lock nut threadably received on the stake and tightened against the member, so as to secure the stake to the member.

4. The ladder safety support as claimed in claim 1, said stake presenting a penetrable stake length not less than about 1 inch.

5. The ladder safety support as claimed in claim 4, said stake length being not less than about 5 inches.

6. The ladder safety support as claimed in claim 4, said stake presenting a circular cross-section and an average stake diameter, wherein said diameter is not less than about 0.25 inches.

7. The ladder safety support as claimed in claim 6, said stake diameter being within the range of about 0.50 to 2.00 inches.

8. The ladder safety support as claimed in claim 1; and a surface-engaging plate coupled to the shiftable member, said surface-engaging plate presenting a substantially flat, downwardly oriented surface-engaging face that projects laterally outward relative to the stake, with the stake projecting downwardly beyond the surface-engaging face.

9. The ladder safety support as claimed in claim 8, said face presenting an area within the range of about 5 to 100 square inches.

10. The ladder safety support as claimed in claim 8;

said plate defining a plate opening, said threaded portion of the stake extending through the plate opening, a lock nut threadably received on the stake and tightened against the plate, so as to sandwich the plate between the lock nut and shiftable member.

11. A ladder safety support for supporting a ladder on a surface, said support comprising:

a connector configured to be fixed to the ladder;

a shiftable member shiftably supported on the connector;

a surface-penetrating stake configured to penetrate the surface, said stake being coupled to the member, such that the stake is shiftable relative to the ladder, said connector and member presenting slidably interconnected upright elements, with one of the elements presenting a plurality of spaced openings and the other of said elements presenting at least one hole, wherein said at least one hole is coaxially alignable with each of said openings so as to cooperatively define a plurality of combined openings; and a securing assembly including a removable pin, wherein at least a portion of the pin is received in one of said plurality of combined openings, so as to secure the member in a fixed position relative to the connector.

12. The ladder safety support as claimed in claim 11, said elements being telescopically interfitted.

13. The ladder safety support as claimed in claim 11, said securing assembly further including a clip operable to prevent the removal of the pin from the combined opening, and a flexible cable for interconnecting the clip and pin.

14. The ladder safety support as claimed in claim 11, said connector including at least one spacer configured to engage the ladder and space a corresponding one of the elements therefrom, said connector further including a clamping plate configured to engage the ladder in such a manner that the ladder is sandwiched between the clamping plate and spacer, said connector further including at least one fastener interconnecting the spacer and operable to fixedly couple the clamping plate to the ladder.

15. A ladder safety support for supporting a ladder on a surface, said support comprising:

a connector configured to be fixed to the ladder;

a shiftable member shiftably supported on the connector;

a surface-penetrating stake configured to penetrate the surface, said stake being coupled to the member, such that the stake is shiftable relative to the ladder, said stake being removably attached to the member; and a surface-engaging pad removably attachable to the member, so that the stake and pad are interchangeable.

16. A ladder assembly comprising:

a ladder including a plurality of upright stiles and a plurality of rungs extending between and spaced alone corresponding ones of the stiles; and a ladder safety support configured to support the ladder on a surface, said ladder safety support including:

an attachment assembly securing the support to the ladder, and a surface-penetrating stake supported by the attachment assembly and configured to penetrate the surface, said surface-penetrating stake presenting an externally threaded upper end portion, said shiftable member presenting an internally threaded section that threadably engages the threaded end portion of the stake.

17. The ladder assembly as claimed in claim 16, said surface-penetrating stake having a lower tapered end portion presenting a pointed tip.

18. The ladder assembly as claimed in claim 16; and a lock nut threadably received to the stake and tightened against the attachment assembly, so as to secure the stake to the attachment assembly.

19. The ladder assembly as claimed in claim 16, said stake presenting a penetrable stake length not less than about 1 inch.

20. The ladder assembly as claimed in claim 19, said stake length being not less than about 5 inches.

21. The ladder assembly as claimed in claim 19, said stake presenting a circular cross-section and an average stake diameter, wherein said diameter is not less than about 0.25 inches.

22. The ladder assembly as claimed in claim 21, said stake diameter being within the range of about 0.50 to 2.00 inches.

23. The ladder assembly as claimed in claim 16; and a second ladder safety support attached to the ladder, and including:

a second attachment assembly securing the second support to the ladder, and a second ground-penetrating stake supported by the second attachment assembly and configured to penetrate the ground, so as to cooperatively anchor the ladder in the secured position.

24. The ladder safety assembly as claimed in claim 23, said first and second stakes each being selectively shiftable relative to the ladder, so as to present respective first and second sets of substantially equally spaced apart fixable positions, said first and second pluralities of fixable positions being vertically offset.

25. The ladder safety assembly as claimed in claim 24, said first and second pluralities of fixable positions being vertically offset by 0.50 inches.

26. A ladder assembly comprising:

a ladder including a plurality of upright stiles and a plurality of rungs extending between and spaced along corresponding ones of the stiles; and a ladder safety support configured to support the ladder on a surface, said ladder safety support including:

an attachment assembly securing the support to the ladder, and a surface-penetrating stake supported by the attachment assembly and configured to penetrate the surface, said attachment assembly including a connector fixedly attached to the ladder, and a shiftable member fixedly attached to the stake, said member being shiftably supported on the connector so that the stake is shiftable relative to the ladder.

27. The ladder assembly as claimed in claim 26, said connector and shiftable member presenting slidably interconnected upright elements, with one of the elements presenting a plurality of spaced openings and the other of said elements presenting at least one hole, wherein said at least one hole is coaxially alignable with each of said openings so as to cooperatively define a plurality of combined openings; and a securing assembly including a removable pin, wherein at least a portion of the pin is received in one of said plurality of combined openings, so as to secure the member in a fixed position relative to the connector.

28. The ladder safety assembly as claimed in claim 26, said elements being telescopically interfitted.

29. The ladder safety assembly as claimed in claim 26, said securing assembly further including a clip operable to prevent the removal of the pin from the combined opening, and a flexible cable for interconnecting the clip and pin.

30. A ladder assembly comprising:

a ladder including a plurality of upright stiles and a plurality of rungs extending between and spaced alone corresponding ones of the stiles; and a ladder safety support configured to support the ladder on a surface, said ladder safety support including:

an attachment assembly securing the support to the ladder, and a surface-penetrating stake supported by the attachment assembly and configured to penetrate the surface, said attachment assembly including at least one spacer configured to engaging one of the stiles and spacing the connector therefrom, said attachment assembly further including a clamping plate engaging the one stile, with the one stile being sandwiched between the clamping plate and spacer, said attachment assembly further including at least one fastener interconnecting the spacer and operable to fixedly couple the clamping plate to the stile.

31. A ladder assembly comprising:

a ladder including a plurality of upright stiles and a plurality of rungs extending between and spaced along corresponding ones of the stiles; and a ladder safety support configured to support the ladder on a surface, said ladder safety support including:

an attachment assembly securing the support to the ladder, a surface-penetrating stake supported by the attachment assembly and configured to penetrate the surface, and a surface-engaging plate coupled to the attachment assembly, said surface-engaging plate presenting a substantially flat, downwardly oriented surface-engaging face that projects laterally outward relative to the stake, with the stake projecting downwardly beyond the surface-engaging face.

32. The ladder assembly as claimed in claim 31, said face presenting an area within the range of about 5 to 100 square inches.

33. The ladder assembly as claimed in claim 31, said surface-penetrating stake presenting an externally threaded upper end portion, said attachment assembly presenting an internally threaded section that threadably engages the threaded portion of the stake, said plate defining a plate opening, said threaded portion of the stake extending through the plate opening, a lock nut threadably received on the stake and tightened against the plate, so as to sandwich the plate between the lock nut and attachment assembly.

34. A ladder assembly comprising:

a ladder including a plurality of upright stiles and a plurality of rungs extending between and spaced alone corresponding ones of the stiles; and a ladder safety support configured to support the ladder on a surface, said ladder safety support including:

an attachment assembly securing the support to the ladder, a surface-penetrating stake supported by the attachment assembly and configured to penetrate the surface, said stake being removably attached to the attachment assembly, and a surface-engaging pad removably attachable to the attachment assembly, so that the stake and pad are interchangeable.

35. A ladder safety support for supporting a ladder on a surface, said support comprising:

a connector configured to be fixed to the ladder;

a shiftable member shiftably supported on the connector; and a surface-engaging pad removably fixed to the member, so that the pad is shiftable relative to the connector;

said pad including an elongated rod presenting upper and lower rod ends, and a base universally connected to the rod adjacent the lower rod end, said rod having a threaded upper end portion, said shiftable member presenting a threaded section that threadably engages the threaded end portion of the rod, said connector including at least one spacer projecting from the corresponding element and configured to engage the ladder so as to space the element therefrom, said connector further including a clamping plate configured to engage the ladder in such a manner that the ladder is sandwiched between the plate and spacer, said connector further including at least one fastener interconnecting the spacer and operable to fixedly couple the clamping plate to the ladder.

36. The ladder safety support as claimed in claim 35; and a ball joint rotatably coupling the base to the rod at the first rod end.

37. The ladder safety support as claimed in claim 35, said base including a circular disc having an average disc diameter not less than about 3 inches.

38. The ladder safety support as claimed in claim 37, said disc diameter being within the range of 5 to 50 inches.

39. The ladder safety support as claimed in claim 35, said connector and member presenting slidably interconnected upright elements, with one of the elements presenting a plurality of spaced openings and the other of said elements presenting at least one hole, wherein said at least one hole is coaxially alignable with each of said openings so as to cooperatively define a plurality of combined openings; and a securing assembly including a removable pin, wherein at least a portion of the pin is received in one of said plurality of combined openings, so as to secure the member in a fixed position relative to the connector.

40. The ladder safety support as claimed in claim 39, said elements being telescopically interfitted.

41. The ladder safety support as claimed in claim 39, said securing assembly further including a clip operable to prevent the removal of the pin from the combined opening, and a flexible cable for interconnecting the clip and pin.

42. The ladder safety support as claimed in claim 35, said threaded portion being externally threaded, said threaded section being internally threaded.

* * * * *